United States Patent
Aliakseyeu et al.

(10) Patent No.: US 12,313,728 B2
(45) Date of Patent: May 27, 2025

(54) CHANGING TRANSMISSION AND/OR RECEPTION CHARACTERISTICS FOR DETECTING EVENTS OTHER THAN HUMAN PRESENCE

(71) Applicant: SIGNIFY HOLDING B.V., Eindhoven (NL)

(72) Inventors: Dzmitry Viktorovich Aliakseyeu, Eindhoven (NL); Berent Willem Meerbeek, Veldhoven (NL); Hugo Jose Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 235 days.

(21) Appl. No.: 17/775,384

(22) PCT Filed: Nov. 10, 2020

(86) PCT No.: PCT/EP2020/081623
§ 371 (c)(1),
(2) Date: May 9, 2022

(87) PCT Pub. No.: WO2021/094303
PCT Pub. Date: May 20, 2021

(65) Prior Publication Data
US 2022/0413125 A1    Dec. 29, 2022

(30) Foreign Application Priority Data
Nov. 15, 2019    (EP) .................................... 19209314

(51) Int. Cl.
*G01S 13/87*    (2006.01)
*G01S 7/41*    (2006.01)
(Continued)

(52) U.S. Cl.
CPC ............ *G01S 13/872* (2013.01); *G01S 7/412* (2013.01); *G01S 13/56* (2013.01); *G01S 13/886* (2013.01); *G08B 21/20* (2013.01)

(58) Field of Classification Search
CPC ........ G01S 13/872; G01S 7/142; G01S 13/56; G01S 13/886; G01S 7/415; G01S 13/04;
(Continued)

(56) References Cited

U.S. PATENT DOCUMENTS 8,232,909 B2 *    7/2012    Kroeger .................. G01S 13/56
                                                              340/552
2008/0094190 A1    4/2008    Okada
(Continued)

FOREIGN PATENT DOCUMENTS

AT            16100 U1        1/2019
CN        104601951 A        5/2015
(Continued)

OTHER PUBLICATIONS

Stephan Sigg, et al., "Recent Advances and Challenges in Ubiquitous Sensing", arXiv:1503.04973v1 [cs.HC], Mar. 17, 2015, pp. 1-20.

(Continued)

*Primary Examiner* — Bernarr E Gregory

(57) ABSTRACT

A system (1) is configured to cause a first set of one or more radio frequency signals to be transmitted with a first transmission characteristic and/or a first reception characteristic, e.g. by lighting devices (31-37), detect whether changes in said first set of radio frequency signals are caused by a human (49) presence, detect whether the changes in the first set of radio frequency signals have a further cause, and cause a second set of one or more radio frequency signals to be transmitted with a second transmission characteristic and/or received with a second reception characteristic upon detect- (Continued)

ing that the changes in the first set of radio frequency signals have a further cause. The system is further configured to identify the further cause based on changes in the second set of radio frequency signals and provide output comprising the further cause or in dependence on the further cause.

11 Claims, 6 Drawing Sheets

(51) Int. Cl.
*G01S 13/56* (2006.01)
*G01S 13/88* (2006.01)
*G08B 21/20* (2006.01)

(58) Field of Classification Search
CPC ....... G01S 13/878; G08B 21/20; Y02B 20/40; H04L 12/2816; H05B 47/19; H05B 47/115; A61B 5/7253
See application file for complete search history.

(56) References Cited

U.S. PATENT DOCUMENTS

| | | | | |
|---|---|---|---|---|
| 2010/0321184 | A1* | 12/2010 | Dreuillet | G01S 13/56 340/540 |
| 2011/0285579 | A1* | 11/2011 | Bangera | A61B 5/7253 342/189 |
| 2012/0068876 | A1* | 3/2012 | Bangera | G01S 7/415 342/61 |
| 2013/0147639 | A1 | 6/2013 | Wietfeld et al. | |
| 2017/0086202 | A1 | 3/2017 | Chen | |
| 2018/0012641 | A1 | 1/2018 | Wootton et al. | |
| 2018/0225967 | A1 | 8/2018 | Khojastepour et al. | |
| 2019/0120952 | A1* | 4/2019 | Kim | G01S 13/56 |
| 2019/0250265 | A1 | 8/2019 | Lu et al. | |
| 2019/0272741 | A1 | 9/2019 | Mackenzie et al. | |

FOREIGN PATENT DOCUMENTS

| | | |
|---|---|---|
| DE | 102016210172 A1 | 12/2017 |
| EP | 4059322 B1 | 7/2023 |
| WO | 1999004283 A1 | 1/1999 |
| WO | 2004003591 A1 | 1/2004 |
| WO | 2015106666 A1 | 7/2015 |
| WO | 2016103394 A1 | 6/2016 |
| WO | 2021094303 A1 | 5/2021 |

OTHER PUBLICATIONS

Sameera Palipani, et al., "Recent Advances in RF-Based Passive Device-Free Localization for Indoor Applications", AdHoc Networks, 2017, pp. 1-53.

Tiffany M. Phan, "RSS-Based Device-Free Passive Detection and Localization Using Home Automation Network Radio Frequencies", Thesis, Department of Electrical and Computer Engineering, Graduate School of Engineering and Management, Air Force Institute of Technology, Mar. 22, 2018, pp. 1-179.

* cited by examiner

CHANGING TRANSMISSION AND/OR RECEPTION CHARACTERISTICS FOR DETECTING EVENTS OTHER THAN HUMAN PRESENCE

CROSS-REFERENCE TO PRIOR APPLICATIONS

This application is the U.S. National Phase application under 35 U.S.C. § 371 of International Application No. PCT/EP2020/081623, filed on Nov. 10, 2020, which claims the benefit of European Patent Application No. 19209314.4, filed on Nov. 15, 2019. These applications are hereby incorporated by reference herein.

FIELD OF THE INVENTION

The invention relates to a system for detecting human presence based on changes in received radio frequency signals.

The invention further relates to a method of detecting human presence based on changes in received radio frequency signals.

The invention also relates to a computer program product enabling a computer system to perform such a method.

BACKGROUND OF THE INVENTION

In smart homes and smart offices, presence detection is becoming increasingly important, e.g. to automatically switch on and off lights and automatically control heating/air-conditioning. In the last few years, network-based presence sensing technologies have matured and appeared on the market. Notable example is Ivani's "network presence sensing" technology. Applications of this technology range from detecting motion based on a change in the environment to people counting and locating.

The main idea behind the technology, which is typically implemented using RF communications and referred to as RF-based sensing, is measuring changes in metrics of wireless messages (e.g. between IoT devices). The location and number of people, body weight, movement direction and other parameters will influence this behavior, such that based on the detected changes (e.g. variations in signal strength or Channel State Information (CSI)) a person or a group of people can be detected.

The precision and versatility of the system depends on the number of communicating devices and usually gets better when more devices are present (the minimum number of devices is two such that signals can be generated and received to evaluate their behavior). In her thesis titled "RSS-based device-free passive detection and localization using home automation network radio frequencies" (March 2018), Tiffany M. Phan of the Air Force Institute of Technology, describes several techniques for implementing RF-based sensing. For example, baseline comparison is an intuitive method for RSS-based detection where the target is detected in the area of interest if the RSS decreases significantly from the baseline.

Currently, RF-based sensing is trained and tuned to detect people's presence and discards other events. However, RF-based sensing could also be used to detect other events that cannot not be classified as human presence assuming that these events generate detectable changes in wireless message metrics.

US 2019/250265A1 discloses a system including a radio frequency (RF) wireless communication network (network) including a plurality of nodes in an area and a computer coupled to the network. Each of the nodes includes a transmitter and a receiver. At plurality of times, each transmitter transmits RF spectrum signals (signals) and each receiver receives the signals and also generates an indicator data of a signal characteristic of the received signal propagated in the network. When each time among the plurality of times is a current time, the computer obtains the indicator data of the signal, determines a modification in the indicator data at the current time from the indicator data at a preceding time due to a movement of an occupant in the area and detect an occupancy condition in the area based on the modification in the indicator data and a parameter of a configuration of the network.

SUMMARY OF THE INVENTION

It is a first object of the invention to provide a system, which uses radio frequency-based sensing to detect events other than human presence.

It is a second object of the invention to provide a method, which uses radio frequency-based sensing to detect events other than human presence.

In a first aspect of the invention, a system for detecting human presence based on changes in received radio frequency signals comprises at least one input interface, at least one output interface, and at least one processor configured to cause, via said at least one output interface, a first set of one or more radio frequency signals to be transmitted with a first transmission characteristic and/or received with a first reception characteristic, detect, via said at least one input interface, whether changes in said first set of radio frequency signals are caused by a human presence, detect, via said at least one input interface, whether said changes in said first set of radio frequency signals have a further cause, cause, via said at least one output interface, a second set of one or more radio frequency signals to be transmitted with a second transmission characteristic and/or received with a second reception characteristic upon detecting that said changes in said first set of radio frequency signals have a further cause, said second transmission characteristic being different than said first transmission characteristic and said second reception characteristic being different than said first reception characteristic, identify said further cause based on changes in said second set of radio frequency signals, and provide, via said at least one output interface, output comprising said further cause or in dependence on said further cause.

RF-based sensing detects changes in RF signals which are mainly caused by water or metals. Because of this, it is usually geared towards human presence detection, but other large bodies of water (absorbing RF signals) and large metal objects (reflecting RF signals) can also affect it. As RF-based sensing works by detecting changes in RF signals, there is a time component. Said further cause for said changes in the RF signals may be a slow increase of a water body, a sudden change in a water body, a water body moving between floors, a driving car, or a parked car, for example.

Transmission and reception characteristics that are optimized for human presence detection are typically not optimal for detecting other events. It may therefore be necessary to use different transmission and/or reception characteristics to determine exactly what the further cause for the changes in the RF signals is. The result is a multi-step RF-based sensing process. Said first set of one or more radio frequency signals and said second set of one or more radio frequency signals may differ in message rate, transmission frequency, duration, content and/or transmitting device, for example.

First and second reception characteristics may differ with respect to the number of antennas that are used to receive the RF signals and/or with respect to the receiving device(s), for example. An example of providing output in dependence on the further cause is controlling a lighting device according to a light setting associated with the further cause.

The first and second sets of RF signals may differ in a single transmission or reception characteristic, but they could also differ in multiple transmission characteristics and/or multiple reception characteristics. The difference between the first characteristic and the second characteristic may lie in the types of characteristics used or in the values of a certain type of characteristic that is used. As an example of the former, signal amplitude variations may be used in the second set of RF signals, but not in the first set of RF signals. As an example of the latter, the values of the used transmission frequency may be different.

Said at least one processor may be configured to detect said human presence and/or identify said further cause by comparing said changes in said radio frequency signals with signatures of known causes. This allows other events than human presence to be classified if they have a detectable signature that can be used to infer the event.

Said at least one processor may be configured to transmit, via said at least one output interface, a message comprising said further cause. This makes it possible to alert a user that an event has been detected, e.g. to allow the user to check whether this event is out of the ordinary. The message may also be transmitted to inform the user that an expected event has happened, e.g. "bathtub is ready".

Said at least one processor may be configured to control, via said at least one output interface, a lighting device in response to detecting said human presence and/or in response to identifying said further cause. The light source of the lighting device may be automatically activated upon detecting human presence and automatically deactivated when human presence has not been detected for a certain period, for example. The intensity of a light source of an outdoor lighting device may be increased when it is raining, for example. Alternatively or additionally, a user may be notified of the further cause with the help of the lighting device, e.g. by blinking red if there may be a water leakage. The lighting device may be controlled by controlling a smart plug, e.g. a Hue smart plug, to which the lighting device is coupled. In this case, the lighting device (and thereby its light source) may be turned on or turned off via the smart plug in response to detecting the human presence and/or in response to identifying the further cause. Instead of or in addition to rendering light, sound may be rendered in response to detecting the human presence and/or in response to identifying the further cause.

Said at least one processor may be configured to determine said changes in said radio frequency signals by comparing signal strengths of said radio frequency signals with signal strengths of previous radio frequency signals received at a directly preceding moment. By determining changes between successive signal strengths, it is not necessary to determine signal strengths of reference RF signals at a reference moment, e.g. at a moment when no human is present and no other event is occurring.

Said at least one processor may be configured to determine said changes in said radio frequency signals by comparing signal strengths of said radio frequency signals with signal strengths of reference radio frequency signals received at a reference moment. Although this requires the system to be calibrated, this may make it easier to match changes with signatures of known causes in certain situations. The reference moment may be a moment when no human is present and no other event is occurring, for example, and the calibration might also be done automatically without involvement of the user.

Said at least one processor may be configured to identify said further cause further based on whether said human presence was detected. The presence of a human may make identifying the further cause easier. For example, by detecting human presence, it may be possible to distinguish a person taking a shower from a leakage.

Said at least one processor may be configured to identify said further cause further based on data obtained from one or more further sensors. For example, a presence sensor may be used to distinguish if a detected large water body is caused by multiple people or by a leakage.

Said at least one processor may be configured to detect further human presence based on said second set of radio frequency signals. Although the transmission characteristics and/or reception characteristics of the second set of radio frequency signals are optimized for identifying the further cause, it may be possible to detect human presence based on these signals as well, e.g. in certain situations.

Said at least one processor may be configured to receive, via said at least one input interface, user feedback and use said user feedback to improve software for identifying said further cause. The user feedback may comprise the user changing a setting immediately after the output has been provided. The user may be asked for clarification why he changed the setting. The user feedback may be transmitted to an Internet server.

In a second aspect of the invention, a method of detecting human presence based on changes in received radio frequency signals comprises causing a first set of one or more radio frequency signals to be transmitted with a first transmission characteristic and/or received with a first reception characteristic, detecting whether changes in said first set of radio frequency signals are caused by a human presence, detecting whether said changes in said first set of radio frequency signals have a further cause, causing a second set of one or more radio frequency signals to be transmitted with a second transmission characteristic and/or received with a second reception characteristic upon detecting that said changes in said first set of radio frequency signals have a further cause, said second transmission characteristic being different than said first transmission characteristic and said second reception characteristic being different than said first reception characteristic, identifying said further cause based on changes in said second set of radio frequency signals, and providing output comprising said further cause or in dependence on said further cause. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for detecting human presence based on changes in received radio frequency signals.

The executable operations comprise causing a first set of one or more radio frequency signals to be transmitted with a first transmission characteristic and/or received with a first reception characteristic, detecting whether changes in said first set of radio frequency signals are caused by a human presence, detecting whether said changes in said first set of radio frequency signals have a further cause, causing a second set of one or more radio frequency signals to be transmitted with a second transmission characteristic and/or received with a second reception characteristic upon detecting that said changes in said first set of radio frequency signals have a further cause, said second transmission characteristic being different than said first transmission characteristic and said second reception characteristic being different than said first reception characteristic, identifying said further cause based on changes in said second set of radio frequency signals, and providing output comprising said further cause or in dependence on said further cause.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java(TM), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
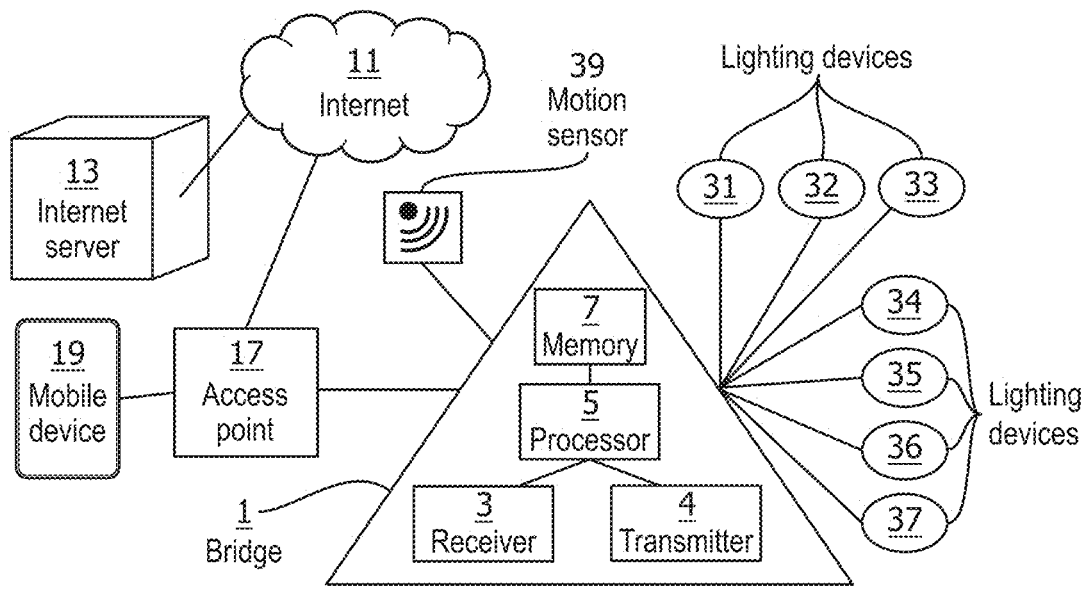
FIG. 1 is a block diagram of an embodiment of the system.

FIG. 1 shows an embodiment of the system for detecting human presence based on changes in received radio frequency (RF) signals. In this first embodiment, the system is a bridge 1. The bridge 1 comprises a receiver 3, a transmitter 4, a processor 5, and a memory 7. The processor 5 is configured to cause, via the transmitter 4, a first set of one or more radio frequency signals to be transmitted with a first transmission characteristic and/or received with a first reception characteristic. In the example of FIG. 1, the one or more RF signals are transmitted by one or more of the lighting devices 31-37. The one or more RF signals are received by the other lighting devices 31-37. The lighting devices 31-37 may be Hue lamps and the bridge 1 may be a Hue bridge, for example.

In the embodiment of FIG. 1, the bridge 1 uses the transmitter 4 to instruct the lighting devices 31-37 which transmission characteristics to use for transmitting the RF signals and/or which reception characteristics to use for receiving the RF signals, and optionally whether to transmit or receive the RF signals. The bridge 1 may itself also take part in the presence sensing by transmitting (using the transmitter 4) or receiving (using receiver 3) RF signals.

The processor 5 is further configured to detect, via the receiver 3, whether changes in the first set of radio frequency signals are caused by a human presence (or caused by a human or animal presence), and detect, via the receiver 3, whether the changes in the first set of radio frequency signals have a further cause. In the embodiment of FIG. 1, the processor 5 uses the receiver 3 to receive data, from which these detections are possible, from the lighting devices that received the RF signals. These data may comprise signal strengths or Channel State Information (CSI) or changes in signals strengths or CSI, for example. The data may be transmitted in the RF signals that are used for RF-based presence sensing, in other RF signals or in non-RF signals. When the bridge 1 itself also takes part in the presence sensing, the strength or CSI of the RF signals received via the receiver 3 may be analyzed.

The processor 5 is further configured to cause, via the transmitter 4, a second set of one or more radio frequency signals to be transmitted with a second transmission characteristic and/or received with a second reception characteristic upon detecting that the changes in the first set of radio frequency signals have a further cause. The second transmission characteristic is different than the first transmission characteristic and the second reception characteristic is different than the first reception characteristic. The processor 5 is further configured to identify the further cause based on changes in the second set of radio frequency signals and provide, via the transmitter 4, output comprising the further cause or in dependence on the further cause.

In the embodiment of FIG. 1, the processor 5 is configured to identify the further cause further based on data obtained from a motion sensor 39, which transmits data to the bridge 1. In the example of FIG. 1, the output is provided to the mobile device 19 via the wireless LAN access point 17. The bridge 1 may be connected to the wireless LAN access point 17 via Ethernet or Wi-Fi, for example. The mobile device 17 may also be able to control the settings (e.g. on/off, color, dim level) of lighting devices 31-37 via the wireless LAN access point 17 and the bridge 1. Since the output is provided to a device with a display, the output typically comprises the further cause, e.g. the output may be a message comprising the further cause.

Alternatively or additionally, the processor 5 may be configured to control, via the transmitter 4, one or more of the lighting devices 31-37 in response to detecting the human presence and/or in response to identifying the further cause. In the former situation, a user does not need to switch his lighting device(s) on manually. In the latter situation, the lighting device(s) may be used, for example, to convey information, e.g. to alert the user.

The first set of one or more radio frequency signals and the second set of one or more radio frequency signals may differ in message rate, transmission frequency, duration and/or transmitting device. For example, the frequency may be increased from 2.4 GHz to 20 GHz to increase absorption of the RF radiation. The message rate represents how often the RF signals/messages are transmitted. By increasing the message rate of the transmitted RF signals and/or the duration of the RF signals, the detection accuracy increases, but power consumption increases as well and the wireless network might get congested. The transmitting device and the receiving device may be chosen such that a possible cause of the event is positioned in between them. First and second reception characteristics may differ with respect to the number of antennas that are used to receive the RF signals and/or with respect to the receiving device(s), for example.

In the embodiment of FIG. 1, the processor 5 is configured to determine the changes in the radio frequency signals by comparing signal strengths of the radio frequency signals with signal strengths of previous radio frequency signals received at a directly preceding moment. In an alternative embodiment, the processor 5 is configured to determine the changes in the radio frequency signals by comparing signal strengths of the radio frequency signals with signal strengths of reference radio frequency signals received at a reference moment.

In the embodiment of FIG. 1, the processor 5 is configured to detect the human presence and/or identify the further cause by comparing the changes in the radio frequency signals with signatures of known causes. These signatures may be stored on an Internet server 13, which is like wireless LAN access point 17, connected to the Internet 11. The further cause may be a slow increase of a water body, a sudden change in a water body, a water body moving between floors or rooms, a driving car, or a parked car, for example. The following use-cases are examples of how events other than human presence may be detected and identified inside a home:

Event detection in the bathroom. RF-based sensing could detect a slowly growing water body or a slowly reducing water body; this could be attributed to the filling of a bathtub with water or the draining of a bathtub. Shower, toilet flush, use of sink could also be distinguished based on the measured amount of water and movement of water; e.g. flushing a toilet would result in a rapid movement of a water body. A lighting device could then be controlled to provide a better contextual lighting or a connected device (e.g. an HVAC system, thermostat, music player, smart home system, voice assistant) could be informed about the identified event.

Event detection in the living room or in other rooms. RF-based sensing could detect water leakages, water overflow e.g. for a fish tank or aquarium. In this case, a lighting device could show an alerting light effect (e.g. red blinking) or an alerting event could be provided to a connected system (e.g. smartphone, smart home controller, server of a water/utility service company).

The following use-case is an example of how events other than human presence may be detected and identified outside a home:

Event detection in the garden and around the house. In the same way as detecting a toilet being flushed in the home, activated rain or water sprinklers could be detected in the garden. Furthermore, RF-based sensing could also be used to detect passing-by cars and distinguish if a car is parked or not parked in the drive way (in this use case, the change in signal is not due to absorption of the signal by the water, but reflection of the signal due to metal). In case of detected rain, lights outside could be turn brighter to increase visibility of paths or lights inside could turn blue to inform users they need to take an umbrella.

In the embodiment of the bridge 1 shown in FIG. 1, the bridge 1 comprises one processor 5. In an alternative embodiment, the bridge 1 comprises multiple processors. The processor 5 of the bridge 1 may be a general-purpose processor, e.g. ARM-based, or an application-specific processor. The processor 5 of the bridge 1 may run a Unix-based operating system for example. The memory 7 may comprise one or more memory units. The memory 7 may comprise solid-state memory, for example. The memory 7 may be used to store a table of connected lights, for example.

The receiver 3 and the transmitter 4 may use one or more wired or wireless communication technologies, e.g. Ethernet for communicating with the wireless LAN access point 17 and Zigbee for communicating with the lighting devices 31-37, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The bridge 1 may comprise other components typical for a network device such as a power connector. The invention may be implemented using a computer program running on one or more processors.

In the embodiment of FIG. 1, the system of the invention comprises a bridge. In an alternative embodiment, the system of the invention is a different device, e.g. a personal or server computer or a lighting device. In the embodiment of FIG. 1, the system of the invention comprises a single device. In an alternative embodiment, the system of the invention comprises a plurality of devices.

Figure 2:
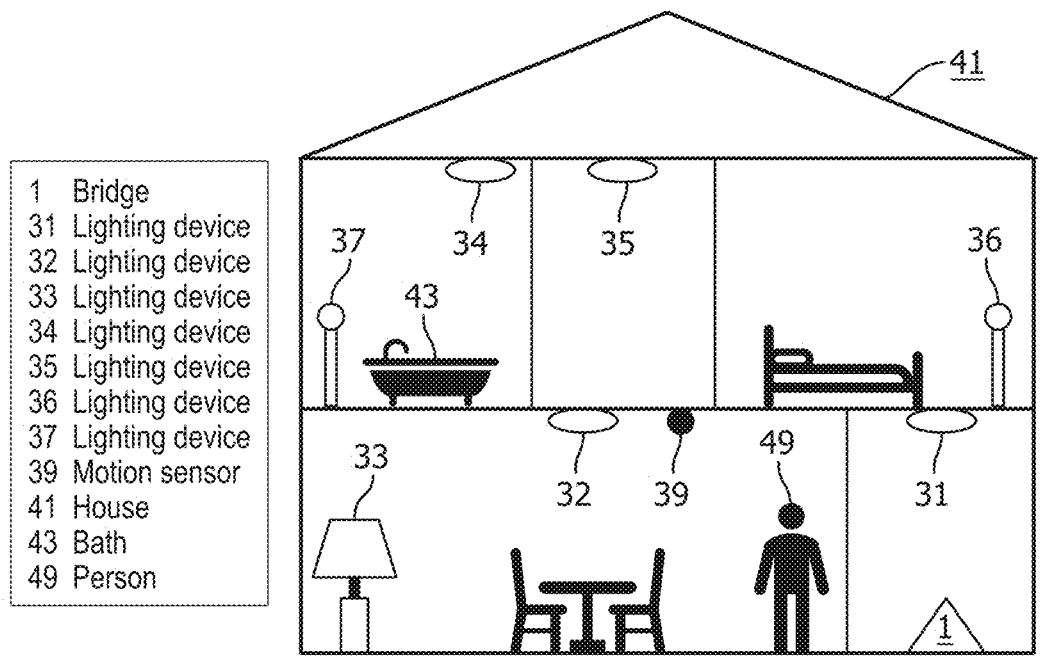
FIG. 2 shows an example of the system of FIG. 1 being used in a house.

FIG. 2 shows an example of the bridge 1 of FIG. 1 being used in a house 41. Lighting device 31 is placed in a hall on the ground floor of the house 41. Lighting devices 32 and 33 are placed in a living room on the ground floor of the house 41. Lighting devices 34 and 37 are placed in a bathroom on the second floor of the house 41. Lighting device 35 is placed in a hall on the second floor of the house 41. Lighting device 36 is placed in a bedroom on the second floor of the house 41. RF signals transmitted by lighting device 32 and received by lighting devices 34 and 37 may be used, for example, to determine whether a bath 43 is full or empty, whether the bath 43 is being filled, whether the bath 43 is being drained, and/or whether the bath 43 is overflowing or not.

A motion sensor 39 is also placed in the living room on the ground floor of the house 41. The motion sensor 39 may be used to help improve the human presence detection. For example, if a person 49 is in the living room and his presence is detected by RF-based sensing helped by the motion sensor 39, a detected large water mass may be determined to be this person 49 rather than a water body moving between floors, e.g. a leakage.

Figure 3:
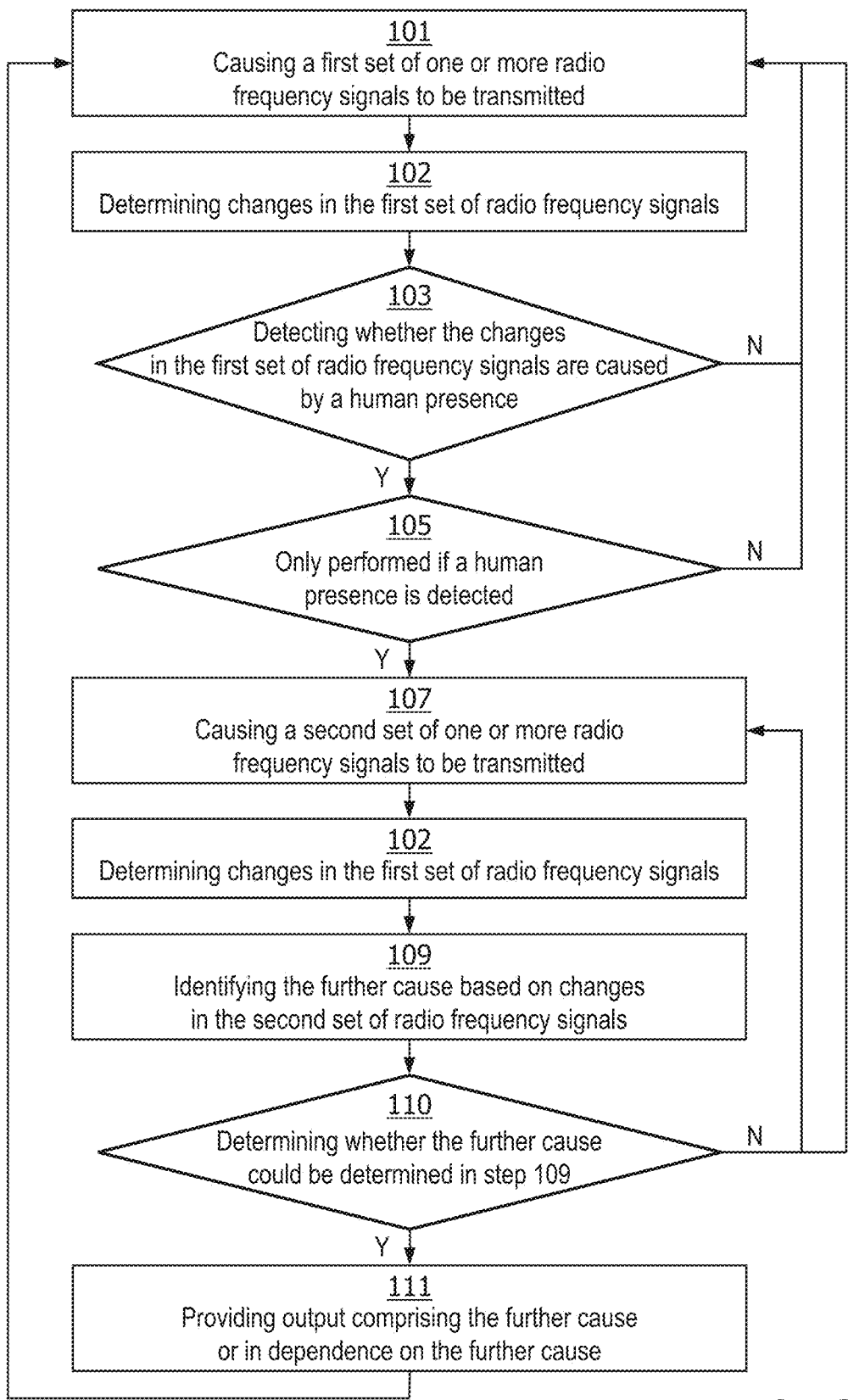
FIG. 3 is a flow diagram of a first embodiment of the method.

A first embodiment of detecting human presence based on changes in received radio frequency signals is shown in FIG. 3. A step 101 comprises causing a first set of one or more radio frequency signals to be transmitted with a first transmission characteristic and/or received with a first reception characteristic. The method may be performed by a controller of a network presence sensing system, for example. A network presence sensing system comprises a plurality of sensing nodes and the controller may be one of these nodes. Lighting devices may be used as sensing nodes, for example. Step 101 may comprise transmitting messages to (other) sensing nodes and/or may comprise transmitting radio frequency signals with the first transmission characteristic and/or receiving radio frequency signals with the first reception characteristic.

A step 102 comprises determining changes in the first set of radio frequency signals. The network presence sensing system monitors the space by continuously sending RF messages between nodes and measuring any deviation from the expected (e.g. calibrated) signal strength.

A step 103 comprises detecting whether the changes in the first set of radio frequency signals are caused by a human presence (or caused by a human or animal presence). In the embodiment of FIG. 3, a step 105 is only performed if a human presence is detected. If no human presence is determined in step 103, step 101 is repeated.

Step 105 comprises detecting whether the changes in the first set of radio frequency signals have a further cause. In step 105, it is only determined whether the changes have a further cause, but it is not possible yet to determine what the further cause is. In the embodiment of FIG. 3, if it is determined in step 105 that the changes do not have a further cause, this means that the human presence is the only cause and step 101 is repeated. If it is determined in step 105 that the changes do have a further cause, a step 107 is performed. In an alternative embodiment, step 105 is omitted and step 107 is performed immediately after step 103.

Based on the data collected by the sensing nodes, the likelihood that the detected deviation is caused by a person (the most frequent event) is estimated in step 103. If the event is classified as person movement or presence, the default behavior such as turn light on is activated. Otherwise more data is collected to distinguish the event from other events in a possible set of events.

Step 107 comprises causing a second set of one or more radio frequency signals to be transmitted with a second transmission characteristic and/or received with a second reception characteristic. The second transmission characteristic is different than the first transmission characteristic and the second reception characteristic is different than the first reception characteristic. Step 102 is performed again after step 107, this time to determine changes in the second set of radio frequency signals.

After detecting a first deviation in the RF signals, RF signals may be transmitted more often and/or with a longer duration to be able to more precisely classify the event, e.g. to detect if there is a continuous or abrupt change in the deviation that could provide more information for the classification. More frequent messages would allow to detect the event sooner and more precisely but would consume more energy (in the case of battery-powered devices) and might interfere with the normal operation of the network (e.g. for connected lighting system, with RF messages that are sent to control the lights).

A step 109 comprises identifying the further cause based on changes in the second set of radio frequency signals. For example, if changes in the RF signals cannot be attributed to a person, e.g. because the movement detected cannot be caused by the person (e.g. water body moving from one floor to another through ceiling), then the most likely event could be toilet flush, leakage, etc. If the water body is too big to be a human, it could be a bathtub. If the body of water gradually changes, either growing or reducing, it could be a leakage, a draining of the bathtub or a filling up of the bathtub. If the body of water appears in a few locations at the same time and stays stable, it could be rain or sprinklers (e.g. if detected in the garden).

Information on the location of the sensing node (e.g. the room type) may be used to better classify the event. For example, the filling up of the bathtub is more likely to be detected by a RF device in the bathroom, while rain is more likely to be detected by an RF device in the garden.

Additionally, adjacent areas might also be used to (at least partially) confirm the first room's conclusion. For example, flooding in room A (e.g. the bathroom on the second floor in FIG. 2) would lead to RF signals in that room to all slowly increase/decrease almost uniformly throughout the room. However, in room B (e.g. the living room on the ground floor in FIG. 2), only the lights close to the shared wall with room A (e.g. lighting device 32 in FIG. 2) would see a similar or smaller slow increase/decrease, while lights farther away (e.g. lighting device 33 in FIG. 2) would not see anything. Even though this behavior could be meaningless for room B (as it does not really fit any known pattern), it can be seen as confirmation of a possible event in room A.

Furthermore, in step 109, historical information may be used for the same space or neighboring spaces to help with classification. Other areas could be used to trace prior events (e.g. movements) to see if the change can be explained by a person moving, or to see whether a body of water increased compared to the previous events/moments, for example.

A step 110 comprises determining whether the further cause could be identified in step 109. If the further cause could not be identified in step 109, then step 101 or step 107 is repeated. Step 101 is repeated if no changes have been determined in the second set of radio frequency signals in step 102 or if the changes determined in step 102 are caused by human presence. Otherwise, step 107 is repeated, with the same or with a different second transmission characteristic and/or second reception characteristic. If the further cause could be identified in step 109, a step 111 is performed. Step 111 comprises providing output comprising the further cause or in dependence on the further cause.

In step 111, depending on the user and/or system, a lighting device may be controlled according to a specific light setting. For example, a specific light scene that is associated with detected events (e.g. relaxing scene in the bathroom if bathtub being filled is detected or warning flashing lights in case of the leakage). In addition to or instead of lighting, a message could be sent to the user, or a state and/or behavior of other connected systems could be changed.

Figure 4:
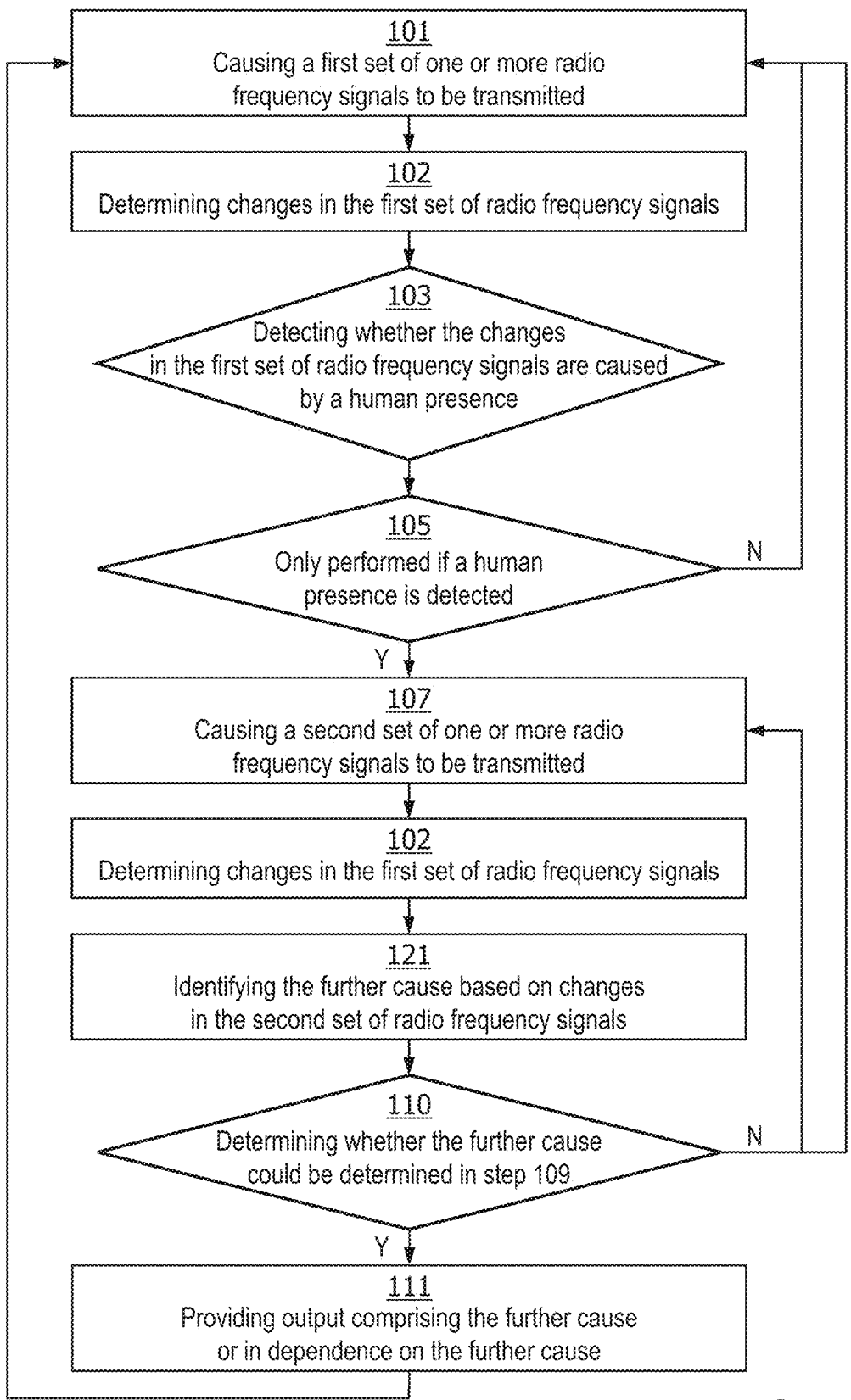
FIG. 4 is a flow diagram of a second embodiment of the method.

A second embodiment of detecting human presence based on changes in received radio frequency signals is shown in FIG. 4. In the embodiment of FIG. 4, compared to the embodiment of FIG. 3, step 105 is performed independent of whether human presence is detected in step 103. Thus, the further cause may be detected even when no human presence is detected. Furthermore, in the embodiment of FIG. 4, step 109 of FIG. 3 is replaced with a step 121. Step 121 comprises identifying the further cause based on changes in the second set of radio frequency signals and based on whether human presence was detected in step 103. In an alternative embodiment, step 121 of FIG. 4 is replaced with step 109 of FIG. 3.

A third embodiment of detecting human presence based on changes in received radio frequency signals is shown in FIG. 5A step 101 comprises causing one or more radio frequency signals to be transmitted with a first transmission characteristic and/or received with a first reception characteristic. Step 102 is performed if there are changes in the radio frequency signals and comprises determining these changes in the radio frequency signals. Step 103 comprises detecting whether the changes in the radio frequency signals are caused by a human presence. Step 105 comprises detecting whether the changes in the radio frequency signals have a further cause. If it is determined in step 105 that the changes do not have a further cause, step 101 is repeated.

If it is determined in step 105 that the changes do have a further cause, step 121 is performed. Step 121 comprises identifying the further cause based on changes in the radio frequency signals and based on whether human presence was detected in step 103. Step 110 comprises determining whether the further cause could be identified in step 121.

If the further cause could not be identified in step 121, then step 107 is performed. Step 107 comprises causing one or more radio frequency signals to be transmitted with a second transmission characteristic and/or received with a second reception characteristic. The second transmission characteristic is different than the first transmission characteristic and the second reception characteristic is different than the first reception characteristic. Step 102 is repeated after step 107, but now for the new one or more radio frequency signals.

If the further cause could be identified in step 121, then step 111 is performed. Step 111 comprises providing output comprising the further cause or in dependence on the further cause. Step 101 is repeated after step 111 to prioritize human presence detection again.

Figure 5:
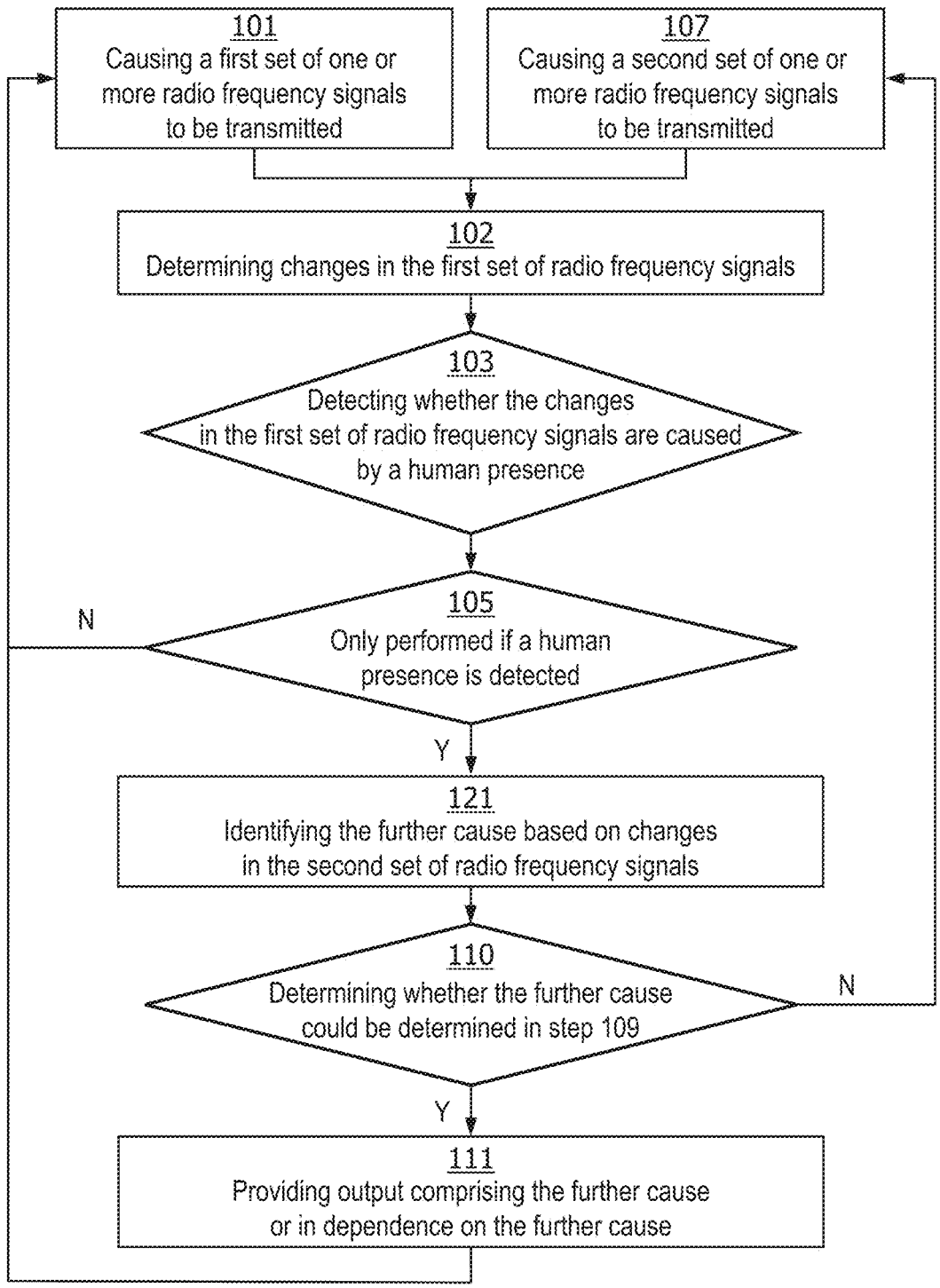
FIG. 5 is a flow diagram of a third embodiment of the method.

Thus, in the embodiment of FIG. 5, there is an attempt to identify the further cause based on the one or more radio frequency signals transmitted with the first transmission characteristic and/or received with the first reception characteristic and not only based on the one or more radio frequency signals transmitted with the second transmission characteristic and/or received with the second reception characteristic. Furthermore, in the embodiment of FIG. 5, there is an attempt to detect human presence based on the one or more radio frequency signals transmitted with the second transmission characteristic and/or received with the first reception characteristic and not just based on the one or more radio frequency signals transmitted with the first transmission characteristic and/or received with the second reception characteristic.

Figure 6:
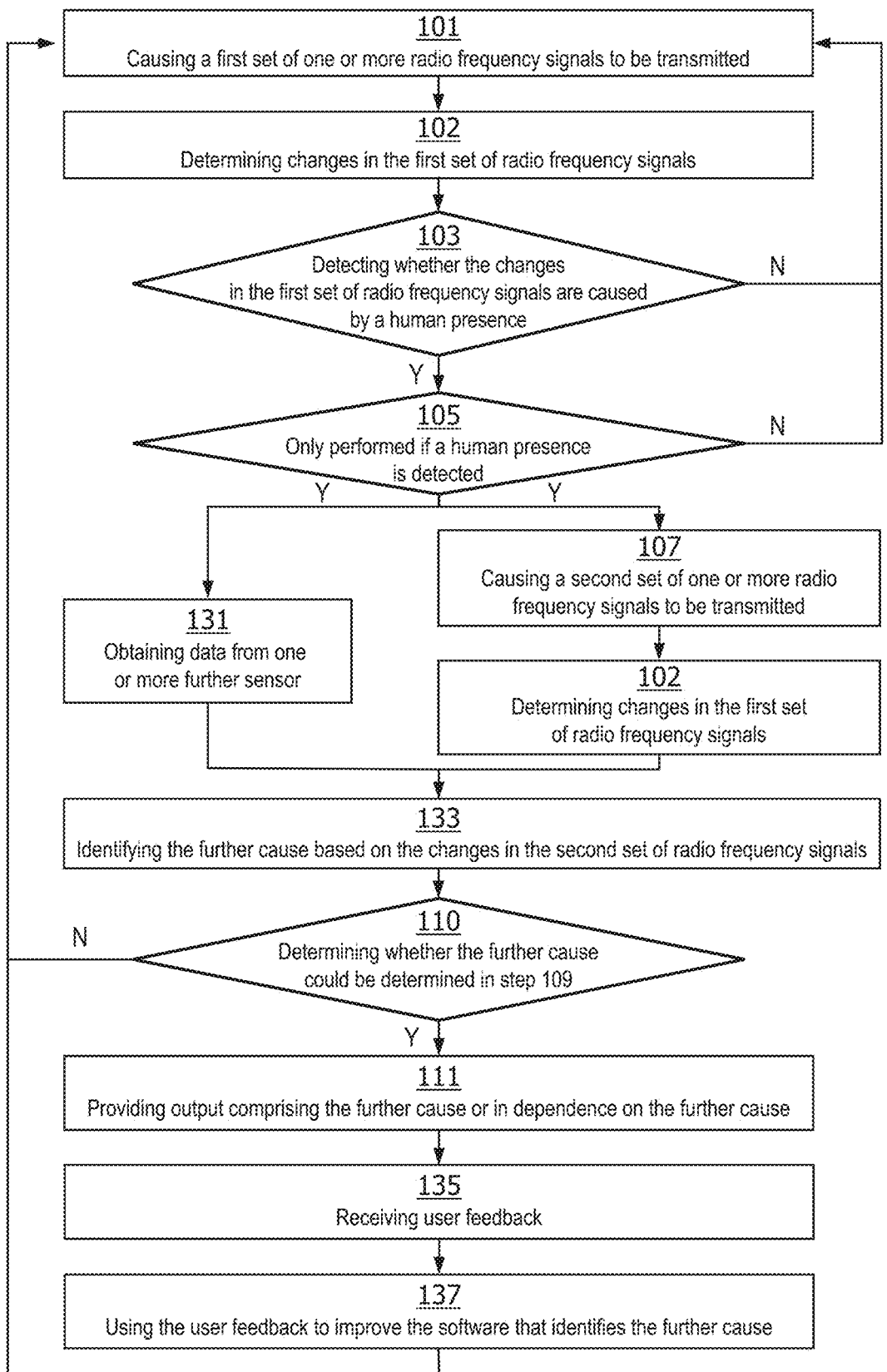
FIG. 6 is a flow diagram of a fourth embodiment of the method.

A fourth embodiment of detecting human presence based on changes in received radio frequency signals is shown in FIG. 6. This fourth embodiment is an extension of the first embodiment. Step 101 comprises causing a first set of one or more radio frequency signals to be transmitted with a first transmission characteristic and/or received with a first reception characteristic. Step 102 comprises determining changes in the first set of radio frequency signals. Step 103 comprises detecting whether the changes in the first set of radio frequency signals are caused by a human presence. In the embodiment of FIG. 6, like in the embodiment of FIG. 3, step 105 is only performed if a human presence is detected. If no human presence is determined in step 103, step 101 is repeated.

Step 105 comprises detecting whether the changes in the first set of radio frequency signals have a further cause. If it is determined in step 105 that the changes do have a further cause, steps 131 and 107 are performed. Step 131 comprises obtaining data from one or more further sensors.

Step 107 comprises causing a second set of one or more radio frequency signals to be transmitted with a second transmission characteristic and/or received with a second reception characteristic. The second transmission characteristic is different than the first transmission characteristic and/or received with the second reception characteristic. Step 102 is performed again after step 107, this time to determine changes in the second set of radio frequency signals.

A step 133 comprises identifying the further cause based on the changes in the second set of radio frequency signals determined in previous step 102 and the data obtained from one or more further sensors in previous step 131. Step 110 comprises determining whether the further cause could be identified in step 133. In the embodiment of FIG. 6, if the further cause could not be identified in step 133, then step 101 is repeated. In an alternative embodiment, either step 101 or steps 131 and 107 are repeated, like the embodiment of FIG. 3, in which step 101 or step 107 is repeated after step 110.

If the further cause could be identified in step 109, step 111 is performed. Step 111 comprises providing output comprising the further cause or in dependence on the further cause. Next, steps 135 and 137 are performed. Step 135 comprises receiving user feedback. Step 137 comprises using the user feedback to improve the software that identifies the further cause, i.e. that implements step 133. This learning loop may be used to improve the user's own system, but also to improve the systems of other users.

In the embodiment of FIG. 6, the user feedback received in step 135 comprises user behavior and this user behavior is used to determine if the further cause has been correctly identified. More specifically, if the user adjusts the setting immediately after a lighting device is controlled with a light setting corresponding to the identified further cause, this could indicate that either the identification of the further cause or the associated light setting was wrong. This information may be used to improve step 133 or alternatively, may trigger the system to ask the user for clarification. In a similar way, the user can train the system by indicating when he starts a certain event (e.g. fill a bathtub) and record the signals following this event so these signal patterns can be associated with this event.

In the embodiment of FIG. 6, two main changes have been made compared to the embodiment of FIG. 3: a) step 131 has been added and step 109 is replaced with step 133; and b) steps 135 and 137 have been added. In an alternative embodiment, only one of these changes has been made.

In the embodiments of FIGS. 3 to 6, step 101 is repeated after step 111 or step 137. In these embodiments, human presence detection is prioritized again after the further cause has been identified. In an alternative embodiment, step 107 is repeated after step 111 or step 137 until there are no longer changes in the RF signals or changes in the RF signals no longer have a cause other than human presence. In this alternative embodiment, step 111 may comprise providing the output only if the same further cause was not previously identified, e.g. if step 111 comprises transmitting a message. Optionally, a message is then transmitted if step 101 is repeated instead of step 107.

Figure 7:
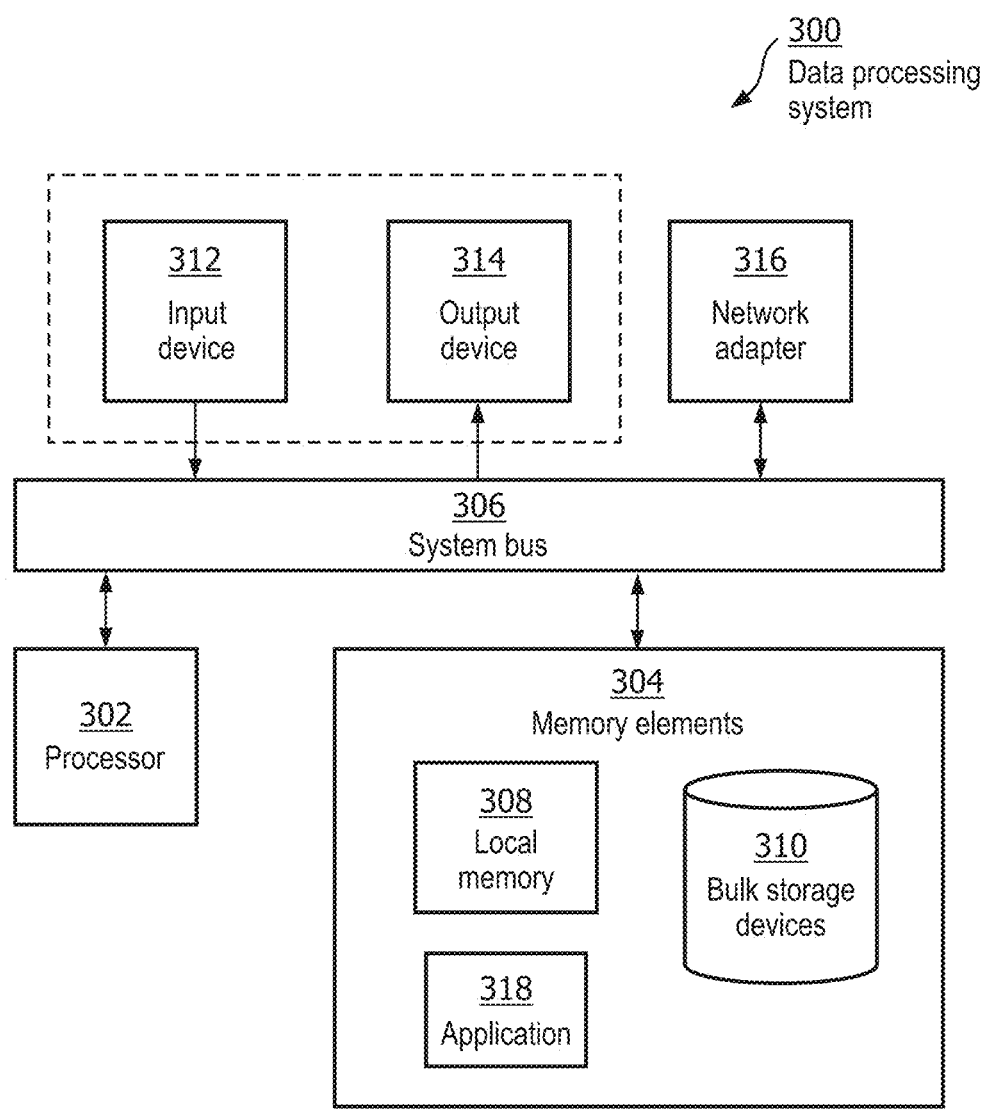
FIG. 7 is a block diagram of an exemplary data processing system for performing the method of the invention.

FIG. 7 depicts a block diagram illustrating an exemplary data processing system that may perform the method as described with reference to FIGS. 3 to 6.

As shown in FIG. 7, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 7, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 7) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 7 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A lighting system for detecting human presence based on changes in received radio frequency signals, said system comprising:
   at least one receiver;
   at least one transmitter; and
   at least one processor configured to:
   cause, via said at least one transmitter, a first set of one or more radio frequency signals to be transmitted with a first transmission characteristic and/or received with a first reception characteristic,
   detect, via said at least one receiver, whether changes in said first set of radio frequency signals are caused by a human presence,
   detect, via said at least one receiver, whether said changes in said first set of radio frequency signals have a further cause,
   cause, via said at least one transmitter, a second set of one or more radio frequency signals to be transmitted with a second transmission characteristic and/or received with a second reception characteristic upon detecting that said changes in said first set of radio frequency signals have a further cause, said second transmission characteristic being different than said first transmission characteristic and said second reception characteristic being different than said first reception characteristic;
   identify said further cause based on changes in said second set of radio frequency signals, and
   provide, via said at least one transmitter, output comprising said further cause or in dependence on said further cause;
   wherein said at least one processor is configured to detect said human presence and/or identify said further cause by comparing said changes in said radio frequency signals with signatures of known causes.

2. The lighting system as claimed in claim 1, wherein said at least one processor is configured to transmit, via said at least one transmitter, a message comprising said further cause.

3. The lighting system as claimed in claim 1, wherein said at least one processor is configured to control, via said at least one transmitter, a lighting device in response to detecting said human presence and/or in response to identifying said further cause.

4. The lighting system as claimed in claim 1, wherein said first set of one or more radio frequency signals and said second set of one or more radio frequency signals differ in message rate, transmission frequency, duration, content and/or transmitting device.

5. The lighting system as claimed in claim 1, wherein said at least one processor is configured to determine said changes in said radio frequency signals by comparing signal strengths of said radio frequency signals with signal strengths of previous radio frequency signals received at a directly preceding moment.

6. The lighting system as claimed in claim 1, wherein said at least one processor is configured to determine said changes in said radio frequency signals by comparing signal strengths of said radio frequency signals with signal strengths of reference radio frequency signals received at a reference moment.

7. The lighting system as claimed in claim 1, wherein said further cause is a increase of a water body, a sudden change in a water body, a water body moving between floors, a driving car, or a parked car.

8. The lighting system as claimed in claim 1, wherein said at least one processor is configured to identify said further cause further based on data obtained from one or more further sensors.

9. The lighting system as claimed in claim 1, wherein said at least one processor is configured to detect further human presence based on said second set of radio frequency signals.

10. The lighting system as claimed in claim 1, wherein said at least one processor is configured to receive, via said at least one receiver, user feedback and use said user feedback to improve method step of identifying said further cause.

11. A method of detecting human presence based on changes in received radio frequency signals, said method comprising:
  causing a first set of one or more radio frequency signals to be transmitted with a first transmission characteristic and/or received with a first reception characteristic;
  detecting whether changes in said first set of radio frequency signals are caused by a human presence;
  detecting whether said changes in said first set of radio frequency signals have a further cause;
  causing a second set of one or more radio frequency signals to be transmitted with a second transmission characteristic and/or received with a second reception characteristic upon detecting that said changes in said first set of radio frequency signals have a further cause, said second transmission characteristic being different than said first transmission characteristic and said second reception characteristic being different than said first reception characteristic;
  identifying said further cause based on changes in said second set of radio frequency signals; and
  providing output comprising said further cause or in dependence on said further cause;
  wherein said human presence detection and/or said identifying said further cause is performed by comparing said changes in said radio frequency signals with signatures of known causes.

* * * * *